United States Patent
Shoji et al.

[11] 3,869,657
[45] Mar. 4, 1975

[54] QUICK CHARGING APPARATUS

[75] Inventors: Magozo Shoji, Kadoma; Motoharu Kitamura, Osaka, both of Japan

[73] Assignee: Matsushita Electric Works, Ltd., Osaka, Japan

[22] Filed: June 22, 1972

[21] Appl. No.: 265,301

[30] Foreign Application Priority Data
June 30, 1971  Japan.................... 46-57685[U]

[52] U.S. Cl................ 320/39, 320/23, 320/DIG. 2
[51] Int. Cl................................................. H02j 7/04
[58] Field of Search............ 320/DIG. 2, 39, 48, 61, 320/22, 23, 20, DIG. 1; 322/28

[56] References Cited
UNITED STATES PATENTS

| | | | |
|---|---|---|---|
| 3,205,422 | 9/1965 | Gold | 320/43 X |
| 3,281,639 | 10/1966 | Potter et al. | 320/43 |
| 3,363,163 | 1/1968 | Nord et al. | 320/DIG. 2 |
| 3,443,195 | 5/1969 | Hoffman, Jr. et al. | 320/39 UX |
| 3,510,746 | 5/1970 | Furuishi et al. | 320/39 |
| 3,617,853 | 11/1971 | Kawashima et al. | 322/28 |
| 3,673,485 | 6/1975 | Vital | 320/2 |

Primary Examiner—J. D. Miller
Assistant Examiner—Robert J. Hickey
Attorney, Agent, or Firm—Wolfe, Hubbard, Leydig, Voit & Osann, Ltd.

[57] ABSTRACT

A quick charging circuit for secondary battery comprises an alternating current source, a battery voltage detecting section including a constant voltage source section and two transistors and connected with said alternating current source, a charging current source section for the battery to be charged, and an indicating means for the completion of the charging. The battery is connected only between the common emitters of the two transistors in the battery voltage detecting section and the negative electrode of the constant voltage source section so that the two transistors will be reverse biased and thereby any fluctuation of the battery voltage in the final charging period will be reduced.

11 Claims, 10 Drawing Figures

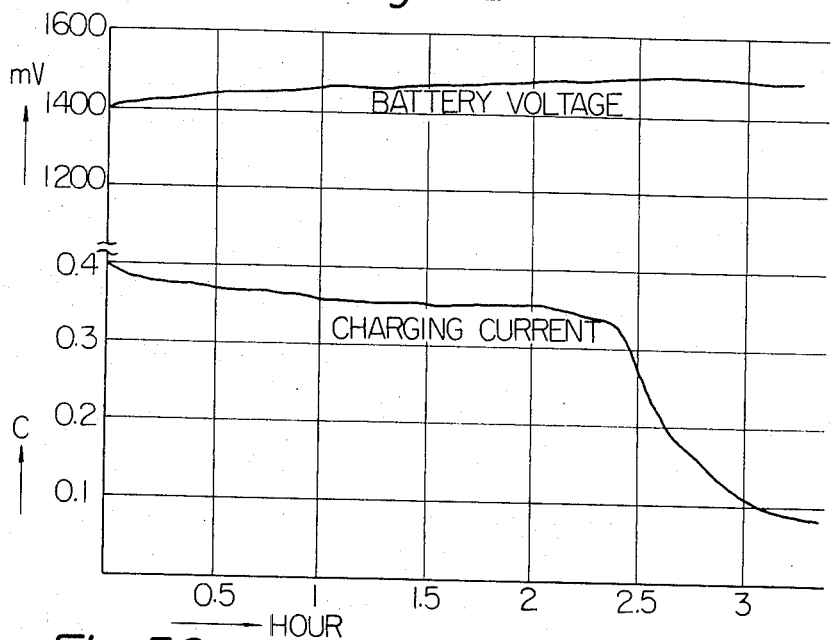
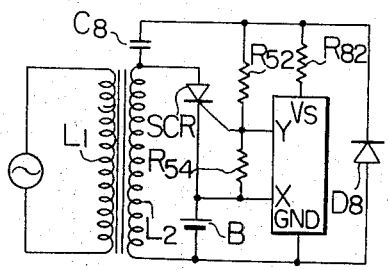
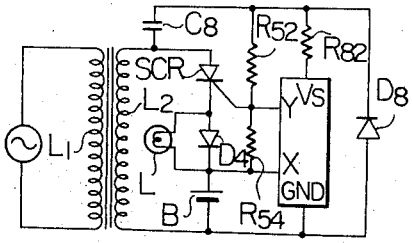
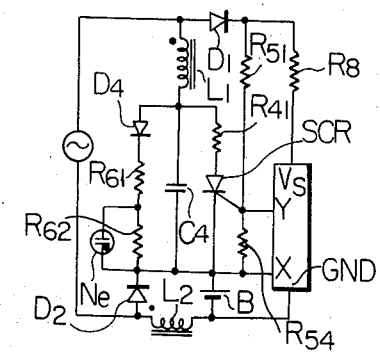

3,869,657

QUICK CHARGING APPARATUS

This invention relates to quick charging circuits for secondary batteries.

There have been already suggested such quick charging circuits of this kind as, for example, of U.S. Pat. Nos. 3,510,746 and 3,441,829.

The present invention relates to a quick charging circuit for secondary batteries and, more particularly, to such a circuit which comprises an alternating current source, a battery voltage detecting section including a constant voltage source section and two common emitter transistors and connected with said alternating current source, a battery to be charged connected only between the common emitters of the two transistors and the negative side of the constant voltage source section, a charging current source section for charging the battery to be charged, and an indicating means for the completion of charging of the battery to be charged.

A main object of the present invention is to provide a charging circuit which is capable of making the width of any fluctuations of the battery voltage occurring at the final charging period to be smaller and allowing the regulation therefore to be made easily.

Another object of the present invention is to provide a charging circuit which is enabled to perform the charging of the battery even during the operation of the battery voltage detecting section at the final charging period although the charging amount is minute.

A further object of the present invention is to provide a charging circuit which shows less variations in performances of the respective circuitry elements and is thus excellent in the reliability.

Another object of the present invention is, therefore, to provide a charging circuit in which a charged electric charge is not naturally discharged by a battery voltage detecting section.

Another object of the present invention is to provide a charging circuit in which a transformer to be used can be made small.

A further object of the present invention is to provide a charging circuit which has a battery voltage detecting section that can be easily made as a monolithic I.C.

The present invention shall be explained in the following with reference to the drawings, in which:

FIGS. 2 to 6 show other embodiments.

Figure 1A:
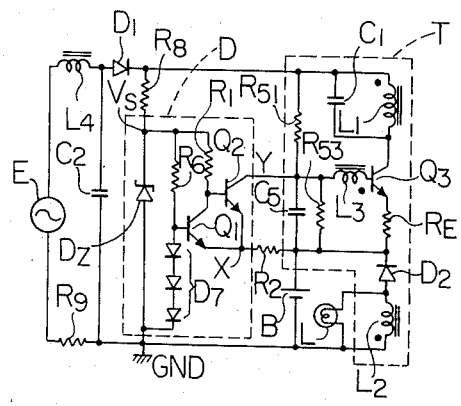
FIG. 1A shows an embodiment of a charging circuit of the present invention.

In FIG. 1A showing a charging circuit according to the present invention, B is a battery to be charged, E is an alternating voltage source, D is a battery voltage detecting section, T is a transistor inverter and L is an indicating lamp.

The entire operation shall be briefly explained. While the charging of the battery B to be charged is so insufficient that the voltage between the battery terminals has not yet reached a predetermined value, the conductivity between the collector and emitter of a transistor $Q_1$ will be high and a transistor $Q_2$ will be cut off. Therefore, a transistor inverter having a transistor $Q_3$ will operate and, during the charging of the battery B, the indicating lamp L will light so as to indicate that the battery is being charged.

On the other hand, when the battery voltage approaches the predetermined value due to the charging, the conductivity between the collector and emitter of the transistor $Q_1$ will reduce and, at the same time, the conductivity of the transistor $Q_2$ will increase, and the voltage (starting voltage) at which the transistor $Q_3$ can operate as an inverter will rise.

The rise of the starting voltage of the transistor $Q_3$ will reduce the operating period of the inverter in each half cycle of a commercial current source, the output (charging current) will reduce and therefore the rise of the battery voltage will be controlled.

When the battery voltage finally reaches the predetermined value, the conductivity of the transistor $Q_2$ will further increase and, even at the peak value of a commercial current source, the base of the transistor $Q_3$ will not be able to be forwardly biased, so that the inverter will remain disabled and the charging will stop.

However, due to the termination of the charging, the battery voltage will reduce with the lapse of time. Therefore, after several cycles of the source current, the charging will be started again and, with the charging of several cycles or, in some cases, of a split cycle, the battery voltage will again reach the predetermined value and the charging will stop.

Thus, while an intermittent charging continues, the battery will be charged little by little, the charging interruption period will gradually become longer than the charging period and the charging current will reduce in average value.

Finally, as the battery itself has an overcharge absorbing capacity, the charging current will reduce to the absorbed charging current value and will converge to a fixed value of the lowest level.

The respective sections of the circuit of FIG. 1A shall be explained in detail in the following. An inductance $L_4$ and condenser $C_2$ form a noise preventing section. $R_9$ is a fuse resistance which will protect the circuit by breaking itself when the circuit is shorted state by any trouble. $D_1$ is a diode to half-wave rectify a commercial source current so that the charger will operate only in a half-wave periods.

$R_8$ is a current source resistance in the battery voltage detecting section.

$D_z$ is a Zener diode operating as a constant voltage source in the battery voltage detecting section. The voltage of the diode $D_z$ as divided with a resistance $R_6$ and diode $D_7$ is fixed as a base voltage of the transistor $Q_1$. A battery B to be charged is connected between a ground GND and the emitter of the transistor $Q_1$. Therefore, the fluctuation of the battery voltage will become a voltage fluctuation between the base and emitter of the transistor $Q_1$ and will vary the conductivity of the transistor $Q_1$.

A transistor $Q_2$ is directly connected with the transistor $Q_1$ to amplify the variation of the conductivity of the transistor $Q_1$, so as to vary the base bias voltage of a transistor $Q_3$ and control the starting voltage of the inverter.

$R_2$ is a resistance, which is not essential, but is added so that, in case the transistor $Q_1$ shifts from ON to OFF and the transistor $Q_2$ shifts from OFF to ON, the increase of the emitter current of the transistor $Q_2$ will be larger than the decrease of the emitter current of the transistor $Q_1$, and the switching of the transistor $Q_2$ will have a hysteresis.

Still referring to in FIG. 1A, the variation of the brightness of the lamp L will correspond to the variation of the charging current so that the progress of the charging can be seen. However, the charging of a battery takes 30 minutes at least, and may take more than 3 hours. Therefore, it is difficult with human eyes to compare the brightness with that in memory after such a long time. In order to remove this difficulty, the hysteresis effect produced by $R_2$ causes the lamp is switched on and off to show the progress of the charging more definitely.

The division of the Zener voltage of the diode $D_z$ with the resistance $R_6$ and diode $D_7$ is to utilize the temperature dependency of the forward voltage drop of the diode $D_7$ to make the temperature characteristics of the switching voltage of the transistor $Q_2$ coincide with the temperature variation characteristics of the battery voltage.

Further, as the Zener voltage of the Zener diode $D_z$ itself varies with the temperature, the base of the transistor $Q_1$ will also be influenced by the temperature characteristics of the diode $D_z$.

Particularly, as the temperature dependency of the Zener voltage varies with voltage (see pages 306 and 396 of the book "Semiconductor Electronics" by Tugomir Surina and Clyde Herrick, published by Holt, Rinehart and Winston, 1964), the temperature variation characteristics of the diode $D_z$ will be able to be freely varied in a considerable range by varying its Zener voltage. Therefore, so long as the battery voltage varies linearly with the temperature, whatever the temperature variation may be, it will be possible to make the temperature characteristics of the switching voltage of the transistor $Q_2$ coincide with the temperature variation characteristics of the battery voltage.

The resistance $R_6$ together with the diode $D_7$ is to divide the Zener voltage so that the switch level of the transistor $Q_2$ will be adjusted by adjusting the resistance $R_6$. It is preferred that the resistance $R_6$ be formed of a thick film resistance in the present invention so that the size will be small and to reduce variations in the resistance value by moisture and dust and the variation of the resistor itself with the lapse of time.

Further, as the forward voltage of the diode $D_7$ is in a functional relation with the increase of the forward current, the adjustment of the switch level of the transistor $Q_2$ by the adjustment of the resistance $R_6$ will be easier than in the case where the diode $D_7$ is a resistance.

Further, as the battery B is connected between the common emitter of the transistors $Q_1$ and $Q_2$ and the ground, so far as the battery voltage detecting section is concerned, the P-N junction of silicon is connected in the direction of blocking the discharge of the battery. Particularly, there are features that, even if the battery is connected with a portable device when it is not being used, the battery will not be discharged and that, even if the current is suspended during the charging, the battery will not be discharged.

From the above fact, it is understood that, in the battery voltage detecting section, when the battery voltage reaches a fixed level due to charging, the transistor $Q_1$ will begin to fluctuate from ON to OFF and the transistor $Q_2$ will begin to fluctuate from OFF to ON. In the case of $R_2 = 0\Omega$, the rise of the battery voltage required until the transistor $Q_2$ shifts from the OFF-state well to the ON-state will depend on the current amplification factor of the transistors $Q_1$ and $Q_2$ but can be easily made less than 10 mV by using an ordinary transistor.

A resistance $R_{51}$ together with a resistance $R_{53}$ gives a fixed bias to an inverter transistor $Q_3$. Particularly, even if the resistance $R_{53}$ is not provided, there will be no problem in the circuit as a self-biasing system. As the battery voltage detecting section will not discharge the battery even when the current is suspended during the charging in the circuit formation as described above, in order that the charging source section will also prevent the discharge, the resistance $R_{53}$ must be eliminated so that $R_{53} = \infty \omega$. According to experiments made by the inventors, even if $R_{53} = 470\omega$, the discharge of the battery will be only about the leakage current (of not more than 0.1 mA) inherent to the battery. Therefore, in FIG. 1A, the circuit is shown with the resistance $R_{53}$ connected.

$C_5$ is a speed-up condenser, and $C_1$ is a condenser for abosrbing a spike voltage generated in a coil $L_1$.

$L_1$, $L_2$ and $L_3$ are respectively primary, secondary (output) and feedback coils wound on the same magnetic core. The dot mark ( · ) in the drawing is the beginning of the winding of each coil.

A resistance $R_E$ is to limit the emitter current of the transistor $Q_3$ and to also adjust the output and at the same time contributes to the stability of the oscillation. $D_2$ is a diode for rectifying the output.

L is a charge complete indicating lamp which is an incandescent lamp connected in parallel with the output winding so as to light only when the inverter is operating. Therefore, when the charging is completed, the inverter will stop and at the same time the lamp L will go out (or reduce the light).

As regards the position of providing the indicating lamp L, further;

i. an arrangement wherein a series connection of a resistance and neon lamp is connected in parallel with the coil $L_1$ is possible but such incandescent lamp as in the present invention is superior in respect of the brightness, and ii. an arrangement wherein an incandescent lamp is inserted instead of the resistance $R_9$ so as to be lighted by the input current of the circuit is also possible, and such lamp will go out (or reduce the light) when the charging is completed but the lamp current will so greatly vary with the fluctuation of the source voltage and the peak value of the lamp current will be so high that the life of the lamp will be short.

In this respect, in the connection of the lamp in the present invention, in the case where the diode $D_2$ is forwardly biased by the output of the coil $L_2$, the output voltage of the coil $L_2$ will be set at a fixed value by the forward voltage of the battery B and diode $D_2$. Therefore, there is a feature that, for example, even if the commercial source voltage fluctuates, the variation of the voltage applied to the lamp will be little and the life of the lamp will be long.

The operation itself of the transistor inverter section is essentially the same as in the explanation on pages 279 to 288 of the book "Semiconductor Electronics" as referred to before but, in the case of the present invention, it will operate only in the period of the half-wave of the commercial source current but the inverter will be automatically stopped in the period of any other half-wave. This inverter is actuated during each half-cycle of the source current, from the point at which the base voltage of the transistor $Q_3$ enables the transistor to become conductive up to the point where the source voltage is lowered to substantially zero. When the transistor $Q_3$ becomes conductive, a current flows through $L_1$ and $C_1$ and on through $Q_3$, $R_E$ and B, and a voltage which is positive at the dotted side of $L_1$ is generated to $L_1$. A voltage is also induced in $L_2$, which forms an output circuit loop with $D_2$ and B, so as to reverse bias $D_2$, and a small current flows to the lamp L. A voltage is also induced in $L_3$, being positive at the dotted side of $L_3$, so that $Q_3$ is additionally biased in the normal direction, and the current flowing through $Q_3$ is increased. $R_E$ is a negative feedback resistance, and the voltage across $R_E$ reverse biases the current between the base and the emitter of $Q_3$, depending on the increase of the current through $Q_3$. When the value of this reverse biasing comes close to the sum of the biasing value due to $R_{53}$ and $R_{51}$ and the induced voltage at $L_3$, the normal biasing for $Q_3$ disappears, and the current through $Q_3$ starts to decrease. At this point, the induced voltage at $L_1$ is negative at the dotted side of $L_1$, and the polarities of the induced voltages at $L_2$ and $L_3$ are also reversed. Therefore, relative to the base of $Q_3$, the induced voltage at $L_3$ has a polarity that reverse biases the current between the base and the emitter of $Q_3$ in accordance with the decrease of the collector current at $Q_3$, so that $Q_3$ is rendered non-conductive. The reversal of the induced voltage at $L_2$ biases $D_2$ so that a current flows through the output circuit to charge the battery. Thereafter, the charged voltage in $C_5$ is discharged through $R_{53}$, but a charging current flows through $R_{51}$ to $C_5$. When $C_5$ is thus charged again, and the voltage across $C_5$ reaches a value sufficient to again normally bias $Q_3$, the inverter will repeat the operation described above. Thus, the magnetic energy accumulated in $L_1$ while $Q_3$ is conductive is exhausted as charging current in the loop including $L_1$ and B when $Q_3$ is non-conductive. The coil $L_3$ has the ability of performing a positive feedback action for causing $Q_3$ to perform its switching action.

Particularly, such oscillator as an inverter has the property that it is difficult to start but that, once it starts, it will be difficult to stop. This property is ingeniously utilized in the charging source current control in the present invention.

Further, the feature of the inverter section of the present invention is that the coil $L_3$ is connected to the base of the transistor $Q_3$ and the connecting point of the resistances $R_{51}$ and $R_{53}$. Particularly, in order to make the charger small in size, the transformer is also made small, and a fine wire is used for a feedback winding. Therefore, the possibility of breaking the wire by any cause is high. In one ordinary method of biasing the transistor $Q_3$, if the connecting point of the resistances $R_{51}$ and $R_{53}$ is brought to the base of the transistor $Q_3$, there will be a danger that, when the wire of the coil $L_3$ breaks, the oscillation will stop, only the direct current bias will flow and the transistor will be overheated and burned out by the collector current corresponding to it.

Particularly this point is a problem in a circuit of the type wherein a transistor is driven directly by a commercial current source. In this respect, when the wire of the coil $L_3$ breaks, the base of the transistor $Q_3$ will open and the transistor $Q_3$ will remain cut off and will therefore stop safely.

In the present invention, the feature derived from the combination of the battery voltage detecting section and the inverter section is that, due to the arrangement in which the inverter operates only in the half-wave period, it is possible to control the charging only by changing the bias of the inverter transistor by switching the transistor $Q_2$. Therefore, it is possible to control such a large current as the charging current with an energy far smaller than in a system which switches the charging current itself. At the same time, in controlling the inverter by the change of the bias, even if there is no hysteresis characteristic in the battery voltage detecting section, the charging will be made in the same manner as there is a slight hysteresis.

That is to say, at the beginning of the half-wave period in which the inverter is to be operated, in case the battery voltage has approached a predetermined value but has not yet reached it, the inverter will begin to operate but, due to the charging accompanying this operation, in the same half-wave period, the battery voltage will reach or exceed the value and the transistor $Q_2$ will shift from OFF to ON to short-circuit the resistance $R_{53}$. But the positive feedback of the inverter by the coil $L_3$ will not be canceled and therefore, until the source voltage becomes zero, irrespective of the battery voltage, the charging will be continued in the half-wave period. Therefore, by just a little rise of the battery voltage as a result of the charging in the half-wave period of the commercial current source, the voltage fluctuates above the level which corresponds to the full charge, the battery will be charged in the same manner as in the case where there is switching hysteresis which is as large as the above mentioned fluctuation of the transistor $Q_2$.

By combining the battery voltage detecting section which does not always have hysteresis characteristics with the bias section of the transistor inverter in such manner as in FIG. 1A, a proper hysteresis property will be naturally produced and, due to this hysteresis property, the battery will be charged with its voltage fluctuation slightly above the predetermined level.

The rise of the battery voltage by the charging in this half-wave section will be very slight if the charging current is of about 1 to 2 C (wherein C is a value of the battery capacity in ampere-hours). Further, in the case of a commercial current source of 60 Hz, the maximum time will be 1/120 sec. and, therefore, no gas will be produced within the battery.

This corresponds to the joggle charging described in the U.S. Pat. No. 3,510,746. Further, in case a transistor inverter is used for the charging current source as in FIG. 1A, the charging current will be in the form of pulses of a high frequency and high peak value. Therefore, the charging efficiency will be higher and the charging characteristics will be higher than in not only the conventional constant voltage charging system but also charging in the form of pulses of a commercial frequency.

Figure 1B:
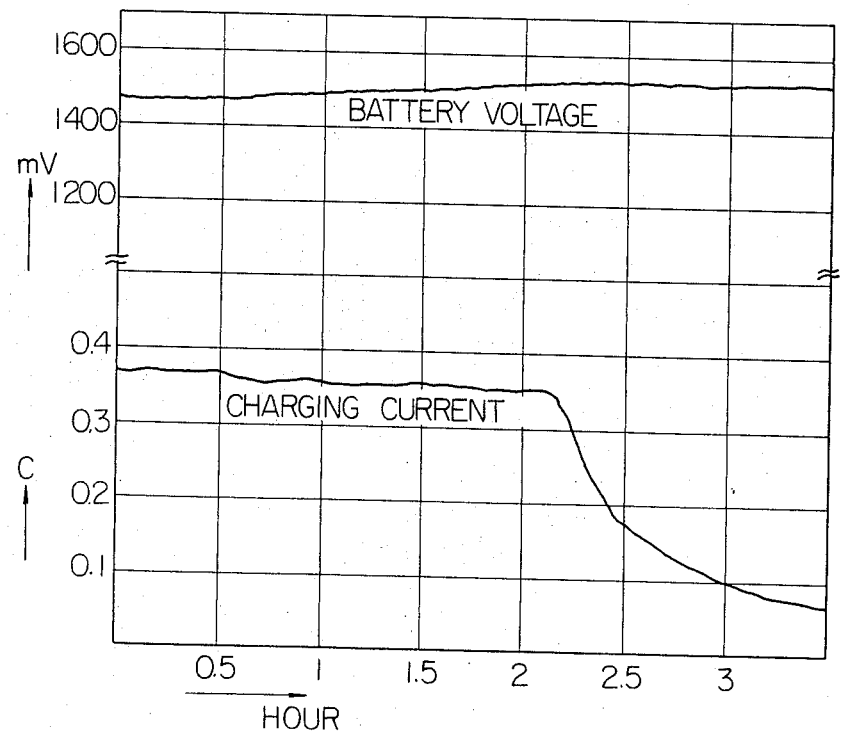
FIG. 1B is a diagram showing charging voltage and current characteristics.

It is understood that the charging characteristics by the charging circuit of the present invention are as shown in FIG. 1B. Further, in FIG. 1A, the Y terminal of the battery voltage detecting section is connected to the connecting point of the resistances $R_{53}$ and $R_{51}$. However, in the case that the switching of the transistor $Q_2$ can be made to have a hysteresis property, the Y terminal may be connected to the base of the transistor $Q_3$. Further, from the viewpoint of controlling the bias voltage of the base of the transistor $Q_3$, the Y terminal can be connected also to the point of dividing the resistance $R_{51}$.

Figure 2:
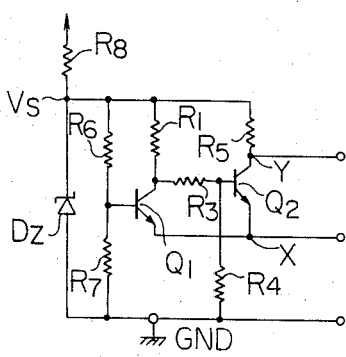

In the battery voltage detecting section within the broken lines in the circuit of FIG. 1A, for example, as in FIG. 2, the base voltage of the transistor $Q_1$ corresponding to a signal input section in the well known Schmitt trigger circuit is fixed and the battery B and resistance $R_2$, as connected between the common emitter to which a resistance is to be connected and the ground, can be also used as made to correspond to the terminals, Vs, Y, X and GND in FIG. 1A.

In this case, too, the same as within the broken lines in FIG. 1A, the hysteresis can be made small by a simpler resistance adjustment than in the conventional Schmitt trigger circuit.

Particularly, in case the hysteresis of the battery voltage detecting section of the charger is of a properly small value, there will be no trouble but, if it is too large, the time required for the charging will be so long that it will be indispensable to reduce the hysteresis.

In the conventional Schmitt trigger circuit, the switching of the transistor $Q_2$ is jumping and the hysteresis property of the transistor $Q_2$ accompanying the jump when it switches to conductive or non-conductive state is in the fact that, before and after the switching of the transistor $Q_2$, the voltage between the common emitter and the ground will remarkably fluctuate.

The larger the positive feedback, which is a source of the jumping switching of the transistor $Q_2$, the larger the hysteresis. Therefore, in case the battery voltage detecting section of the charger is desired to have small hysteresis, the fluctuation of the voltage between the common emitter and the ground before and after the switching of the transistor $Q_2$ may be made small.

In this respect, if, as in FIG. 2, the greater part of the voltage between the common emitter and the ground is held by the battery voltage, which can be considered to be a constant voltage source for a short time, and a very small part is held by the resistance $R_2$ and the iR drop by the current flowing into it, even against the fluctuation of the current before and after the switching of the transistor $Q_2$, the fluctuation rate may be lower than in the case of only a resistance.

In the explanation of the temperature compensation within the broken lines in FIG. 1A, if
  i. the number of P-N junctions of the diode $D_7$ and
  ii. the dependency of the temperature variation characteristics of the Zener voltage of the diode Dz on the Zener voltage
are combined, so long as the temperature variation characteristics of the battery voltage are linear with the temperature, it will be possible to substantially realize any desired value.

Figure 3:
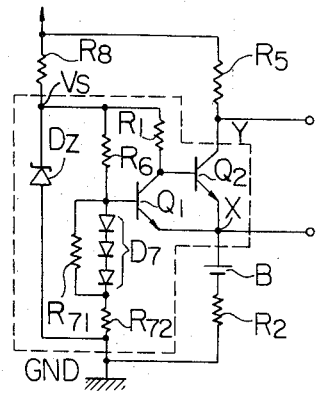

In the case in which the convenience of the design is further taken into consideration in this respect, a resistance may be connected parallel with the diode $D_7$ as in FIG. 3. Also, a thermo-sensitive resistor having a negative resistance temperature coefficient, such as a thermister, may be used instead of the diode $D_7$. On the contrary, a thermo-sensitive resistor having a positive resistance temperature coefficient may be used for the resistance $R_6$.

Figure 4:
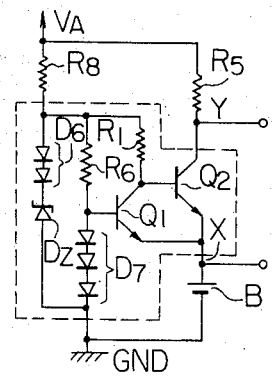

As a means of providing another design convenience in connection with the temperature compensation of the battery voltage detecting section, the temperature characteristics of the diode Dz may be properly varied by adding a forward diode $D_6$ of a P-N junction is series with the diode $D_z$ as in FIG. 4.

Figure 5A:
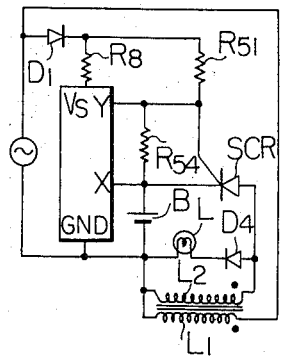

In a charger using the battery voltage detecting system in the broken lines in FIG. 1A and in FIG. 2, the secondary side of a transformer operating at a commercial frequency as rectified may be used as a charging current source as in FIG. 5A in addition to FIG. 1A.

Such case is the same as the conventional art in that the charging current itself is switched and controlled in the charging but the battery will not be discharged in the case of suspension of the current during the charging. Further, the charging characteristics are also the same as in the case of U.S. Pat. No. 3,510,746 and the time required for the charging is shorter than in the charging from a constant voltage source. (See FIG. 5B.)

In FIG. 5A, $L_1$ and $L_2$ are respectively primary and secondary (output) windings of a transformer. The charging is of a type of taking out only half-waves of the output. While the battery is not fully charged and the battery voltage is low, the Y and X terminals will be cut off and therefore the SCR will be given a gate power for each half-cycle and will be flowing a charging current.

On the other hand, when the battery voltage reaches a predetermined value, the Y and X terminals will become conductive from Y to X, the current to the SCR gate through the resistance $R_{51}$ will be by-passed from Y to X. Therefore, the SCR will remain cut off and the charging will be stopped.

In this circuit, the SCR is reversely biased by the battery to a section in which the output voltage of the transformer is below the battery voltage and shifts from the conduction to a cut-off state. Once the SCR conducts, the charging will be made irrespective of the battery voltage during a half cycle. Therefore, as in the case in FIG. 1A, even if there is no hysteresis property in the battery voltage detecting section, the joggle charging will be possible.

While the SCR gate conducts, the voltage between the terminals of the winding $L_2$ will be pressed by (the voltage of the batery B) + (the forward voltage drop between the anode and cathode when SCR is on) and will be so low that the charging completion indicating lamp L in FIG. 5A will not light but, when the illustrated dot mark (.) is of a positive polarity and the SCR is off, the voltage between the terminals of the winding $L_2$ will become high enough to light the lamp L.

Therefore, in the case of FIG. 5A, when the charging is completed, the lamp will be fully lighted.

In FIG. 5A, a commercial current source in which a half cycle of a polarity in which a charging current flows to a battery to be charged is half-wave rectified with the diode $D_1$ on the secondary side of a transformer is made a current source for the battery voltage detecting and controlling sections. In the circuit of FIG. 5C, during the period of a half cycle in which no charging current flows into the battery to be charged in the output on the secondary side of a transformer, a condenser $C_8$ will be charged through the diode $D_8$ and, in the period of a half cycle of a polarity reverse to it, the condenser $C_8$ will operate as a current source for the battery voltage detecting section with the voltage of $C_8$ superposed on the induced voltage of the winding $L_2$.

Therefore, the capacity of condenser $C_8$ should be made so large that the voltage between the terminals will not reduce to be so low as to prevent the development of the function of detecting the battery voltage by the discharge during the period from the half cycle of the charging of the condenser $C_8$ to the half cycle of the next charging through the half cycle of the discharging. In the experiments made by the inventors, when $R_{82} = R_{52} = R_{54} = 2.2$ K$\omega$, the Zener voltage of the diode Dz in the battery voltage detecting section was 5 Vdt and the battery to be charged was a cell of an Ni — Cd secondary battery, if the value of $C_8$ was not less than 3$\mu$F, there was no problem in the operation of the circuit.

Particularly, in the circuit of FIG. 5C, it is necessary that the Zener voltage of the diode Dz should not be higher than a fixed value. In order to reduce the value of $C_8$, the Zener voltage must be made as low as possible.

The primary winding and secondary winding of the transformer operating at a commercial frequency and forming a charging current source section are separated for DC current and the detecting section is operated by the secondary winding output of the above mentioned transformer. According to this system, the loaded circuit including the battery to be charged is separated from the primary side of the commercial current source and is therefore easy to insulate.

FIG. 5D shows a further embodiment, which is fundamentally the same as FIG. 5C but is different in that a charge complete indicating lamp is provided and a diode $D_4$ is added. In the case of FIG. 5D, as compared with the embodiment of FIG. 5A, the indicating lamp is prevented from the application of any excess voltage so that the life of the lamp can be extended. That is, in the case of FIG. 5A, the voltage induced in the coil $L_2$ when the SCR is suspended is caused to be applied in the forward direction of the diode $D_4$ and to the lamp L so that, since the forward direction of the diode $D_4$ is of constant voltage characteristic, any variation of the induction voltage at the coil $L_2$ is caused to be directly applied to the lamp L. In the circuit of FIG. 5D, on the other hand, the voltage across both terminals of the lamp L is made constant in the forward direction of the diode $D_4$ and for this reason any excess voltage is prevented.

The lamp L in the circuit of FIG. 5D is, further, to be lighted when the SCR is in conductive state, that is, the charging current is flowing through the circuit, so that the lamp will go out (or reduce the light) when the charging is completed while being lighted before the completion. This type of indication is reverse to that of the case in FIG. 5A, or FIG. 6 discussed later, but is similar to that of FIG. 1A.

FIG. 6 is another embodiment wherein the secondary side of the transformer ($L_1$, $L_2$) operating with a commercial frequency as rectified is made a charging current source, so that the charging current will be controlled by controlling the primary current of the transformer.

The features of the circuit of FIG. 6 are that
i. as the charging current can be controlled by controlling the primary current of the transformer, the switch element SCR may be of a small current capacity and the loss in the switch element SCR can be minimized,
ii. in case the SCR is used not only as a switch element but also as a rectifying element as in FIG. 5, the forward voltage drop when SCR is on will be larger than the forward voltage drop of the P-N junction silicon rectifier and, therefore, the loss at SCR will be large but, in the present invention, as an ordinary Si junction type diode is used, such loss is small and,
iii. in case switching is made on the primary side of the transformer, due to the high voltage, the excess loss of the switching will be likely to be large but, even if the switching of the transistor $Q_2$ is not jumping, due to the positive feedback accompanying the mechanism of the avalanche when the switch element SCR is turned on, it jumps into conduction abruptly and, therefore, the loss will be small.

Adding a few words to the description of FIG. 6, a condenser $C_4$ is connected in parallel with the SCR so as to operate together with the inductance of the winding $L_1$, so that the condenser will act to protect the SCR from a line surge voltage and, at the same time, operate as an exciting current path for the transformer particularly in a half cycle of a polarity giving a reverse bias to the SCR.

If the value of $C_4$ is too small, the operation as an exciting current path will reduce but, if it is too large, the primary current will become so large that, even in case the SCR is entirely cut off, a charging current will be generated on the secondary side. Therefore, the secondary side output must be adjusted so as to be below the allowable value even if the commercial current source is of the maximum while the SCR is off.

The resistance $R_{41}$ is to prevent a large current due to the discharge of the condenser $C_4$ from flowing to the SCR when the SCR is turned on.

Ne is a neon glow lamp to which the voltage between the terminals of the SCR at the time of the forward cut-off of the SCR as rectified with the diode $D_4$ and then divided with the resistances $R_{61}$ and $R_{62}$ is given so that it will be lighted. Therefore, as in FIG. 5, it will light when the charging is completed.

What we claim is:

1. A controlled quick charging apparatus comprising a charging current source section for charging a battery to be charged, a detecting section for detecting the charging voltage of the battery to be charged, a current source section for operating said charging current source section and detecting section, and a controlling section for controlling the operation of the charging current source section in response to an output signal of the detecting section, said detecting section comprising a constant voltage device, a series circuit of a regulating resistance and a diode means and connected in parallel with said constant voltage device, a first transistor in which a constant voltage at an intermediate position between said regulating resistance and diode means of the series circuit is applied to the base, and a second transistor connected in the form of a common emitter with the first transistor, and said battery to be charged being inserted so as to be connected on its positive electrode side with the common emitter side of said first and second transistors and on its negative electrode side with the negative electrode side of the constant voltage device and with the negative electrode side of said diode means for reverse biasing said first and second transistors by the battery voltage, said first and second transistors being responsive to a predetermined battery voltage for producing said output signal to which said controlling section is responsive.

2. A quick charging apparatus according to claim 1 wherein said charging current source section includes a transformer operated with a commercial frequency, the secondary output voltage of said transformer being applied to both ends of a series circuit of the battery to be charged and a semiconductor switch element having a controlling terminal, and the current flowing to the controlling terminal of said semiconductor switch element being controlled with the detecting section.

3. A quick charging apparatus according to claim 2 wherein a series circuit of a unidirectional constant voltage element and a charging completion indicating lamp is connected to both ends of the secondary winding of the transformer.

4. A quick charging apparatus according to claim 2 wherein the primary winding and secondary winding of said transformer of the charging current source section is separated for direct current, and said detecting section is operated by the secondary side output of the transformer.

5. A quick charging apparatus according to claim 1 wherein said charging current source comprises a transformer operated at a commercial frequency and a device for rectifying the secondary output of said transformer, the primary winding of said transformer being applied to both ends of a series circuit of at least the primary winding, a semiconductor switch element having a control terminal and the battery to be charged, and the current flowing to the controlling terminal of said semiconductor switch element being controlled with the output of said detecting section.

6. A quick charging apparatus according to claim 5 wherein a series circuit of a diode and at least two voltage dividing resistances is inserted in parallel with said semiconductor switch element, and a neon lamp is inserted in parallel with one of said two voltage dividing resistances.

7. A quick charging apparatus according to claim 1 wherein said detecting section comprises a modified Schmitt trigger circuit, the base terminal voltage of said first transistor is kept constant, and said battery to be charged is connected between the common emitter and the ground potential of said modified Schmitt trigger circuit.

8. A quick charging apparatus according to claim 1 wherein a series circuit of a parallel circuit of at least one diode and a resistance and a second resistance is inserted between the base of the first transistor and the negative electrode side of the constant voltage source.

9. A quick charging apparatus according to claim 1 wherein said charging voltage detecting section includes at least two voltage dividing elements giving a constant voltage to the base of the first transistor, and a theremo-sensitive resistor is inserted into at least one of said voltage dividing elements.

10. A quick charging apparatus according to claim 1 wherein said constant voltage device comprises a series circuit of a Zener diode and at least one P-N junction diode for compensating the temperature characteristics of said Zener diode.

11. A quick charging apparatus according to claim 2 wherein a diode is inserted between the negative electrode of said semiconductor switch element and the positive electrode of said battery to be charged in a polarity preventing the discharge of said battery, and a lamp is inserted in parallel with said diode.

* * * * *